United States Patent
Sasaki et al.

(10) Patent No.: US 8,039,555 B2
(45) Date of Patent: Oct. 18, 2011

(54) THERMOPLASTIC RESIN COMPOSITION AND FLOOR TILE MADE OF THE SAME

(75) Inventors: Hiromitsu Sasaki, Chiba (JP); Kenji Shachi, Ibaraki (JP); Daisuke Konishi, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 301 days.

(21) Appl. No.: 12/297,141

(22) PCT Filed: Apr. 4, 2007

(86) PCT No.: PCT/JP2007/057535
§ 371 (c)(1),
(2), (4) Date: Oct. 14, 2008

(87) PCT Pub. No.: WO2007/122995
PCT Pub. Date: Nov. 1, 2007

(65) Prior Publication Data
US 2010/0174027 A1 Jul. 8, 2010

(30) Foreign Application Priority Data

Apr. 18, 2006 (JP) ................ 2006-114338

(51) Int. Cl.
C08F 10/06 (2006.01)
C08F 4/72 (2006.01)
(52) U.S. Cl. ..... 525/240; 525/241; 525/242; 526/348.5; 526/348.6; 526/916; 526/351; 524/451
(58) Field of Classification Search .............. 525/240, 525/241, 242; 526/351, 348.5, 348.6, 916; 524/451
See application file for complete search history.

(56) References Cited

U.S. PATENT DOCUMENTS

| | | | |
|---|---|---|---|
| 6,096,435 A | 8/2000 | Maekawa et al. | |
| 7,282,535 B2 * | 10/2007 | Kakeda et al. | 525/88 |

FOREIGN PATENT DOCUMENTS

| CN | 1509318 A | 6/2004 |
|---|---|---|
| EP | 0 555 930 A2 * | 2/1993 |
| EP | 0 555 930 A2 | 8/1993 |
| EP | 0 555 930 A3 | 8/1993 |
| JP | 03 024149 | 2/1991 |
| JP | 9 32258 | 2/1997 |
| JP | 10 130451 | 5/1998 |
| JP | 10 306196 | 11/1998 |
| JP | 2000 53822 | 2/2000 |
| JP | 2003 327844 | 11/2003 |
| JP | 2005 325234 | 11/2005 |
| JP | 2005-325236 | 11/2005 |
| JP | 2006 037033 | 2/2006 |

* cited by examiner

Primary Examiner — Robert D. Harlan
(74) Attorney, Agent, or Firm — Oblon, Spivak, McClelland, Maier & Neustadt, L.L.P.

(57) ABSTRACT

The invention provides a thermoplastic resin composition including a thermoplastic resin component (I) in an amount of 100 parts by mass, and a filler (II) in an amount of 1 to 900 parts by mass, wherein the thermoplastic resin component (I) contains a block copolymer (A) in an amount of 5 to 90 mass %, the block copolymer (A) being at least one species selected from among a block copolymer and a hydrogenated product thereof, the block copolymer having a polymer block (a1) formed mainly of an aromatic vinyl compound unit(s), and a polymer block (a2) formed mainly of a conjugated diene unit(s); a polyolefin resin (B) in an amount of 5 to 90 mass %; and a block copolymer (C) in an amount of 5 to 90 mass %, the block copolymer (C) having a polymer block formed from a repeating unit having a polar group.

14 Claims, No Drawings

THERMOPLASTIC RESIN COMPOSITION AND FLOOR TILE MADE OF THE SAME

TECHNICAL FIELD

The present invention relates to a thermoplastic resin composition, and to a floor tile formed from the composition. More particularly, the present invention relates to a thermoplastic resin composition which exhibits excellent sheet moldability, scratch resistance, impact resistance (resistance to cracking due to impact during transportation or working), dimensional stability (small temperature-dependent change in size), temperature sensitivity (small difference between sheet flexibility in summer and that in winter), adhesion-to-wax property, bonding to a concrete base (hereinafter may be referred to as "bonding-to-base property"), and installation performance (contouring to the surface of a concrete base), and which contains neither a halogen-containing resin (e.g., a vinyl chloride resin) nor a plasticizer (e.g., a phthalic acid ester); and to a non-vinyl chloride floor tile formed from the thermoplastic resin composition.

BACKGROUND ART

Vinyl chloride resin (PVC) exhibits excellent moldability, can be provided with a variety of colors, and can be formed into products with various designs. In addition, PVC exhibits excellent properties (e.g., sheet moldability, installation performance, chemical resistance, and antifouling property). Therefore, PVC floor tiles have been widely used in place of, for example, conventional linoleum tiles or stone tiles.

However, PVC floor tiles generate toxic chlorine gas in the event of a fire. Therefore, attempts have been made to develop a non-vinyl chloride floor tile which does not generate chlorine gas. In recent years, attempts have also been made to develop a floor tile which does not contain a plasticizer (e.g., a phthalic acid ester)—such a plasticizer has been used in soft PVC materials and has been considered to be endocrine disruptors. Thus, demand has arisen for development of an environmentally friendly material.

Hitherto, there have been many proposals to meet the aforementioned demand. For example, there has been proposed a composition containing no halogen atom; i.e., a composition containing a filler and an olefin resin having a polar group, an ethylene-vinyl acetate copolymer (EVA), an ethylene-ethyl acrylate copolymer (EEA), an ethylene-methyl acrylate copolymer (EMA), or an ethylene-methyl methacrylate copolymer (EMMA). However, in view that, for example, the composition is molded into a sheet only within a narrow temperature range, and a sheet molded therefrom within such a temperature range exhibits low strength, the composition is not satisfactory as an alternative to a resin composition for PVC floor tiles. Meanwhile, conventional non-vinyl chloride floor tiles are inferior to PVC floor tiles, in terms of dimensional stability, adhesion-to-wax property, and bonding-to-base property.

Conventional PVC floor tiles or non-vinyl chloride floor tiles have a drawback in that they exhibit very high temperature sensitivity (i.e., large temperature-dependent change in flexibility), and thus the formulation of a resin composition for forming such tiles must be varied according to the season. Therefore, demand has arisen for development of a resin composition for non-vinyl chloride floor tiles, the composition having sheet moldability comparable or superior to that of a conventional resin composition for PVC floor tiles, as well as development of a non-vinyl chloride floor tile which exhibits excellent scratch resistance, dimensional stability, bonding-to-base property, installation performance, and flexibility, and which is satisfactory as an alternative to a PVC floor tile.

Under such circumstances, for example, Patent Document 1 discloses a polyolefin flooring material containing a polyolefin (A) having high stereoregularity in which the ratio of weight average molecular weight (Mw) to number average molecular weight (Mn); i.e., (Mw/Mn), falls within a range of 1.2 to 4, and Mn is 10,000 to 2,000,000; a polar resin (B) having compatibility with the polyolefin (A); and, optionally, a filler (C) such as calcium carbonate, talc, or silica, wherein the amounts of the polyolefin (A), the polar resin (B), and the filler (C) are 100 parts by weight, 10 to 50 parts by weight, and 500 parts by weight or less, respectively. Patent Document 2 discloses a flooring material consisting of a polyolefin resin composition, the composition containing a C4-C8 α-olefin-ethylene copolymer (A) having a melting peak Tm at 90 to 110° C. as determined through heat flow differential scanning calorimetry (DSC); a propylene resin (B) having a melting peak Tm at 120 to 140° C. as determined in a manner similar to that described above; a petroleum resin (C) having a softening point of 90 to 150° C.; and optionally, an additive such as a filler. However, these flooring materials are inferior to the aforementioned PVC floor tiles (in terms of scratch resistance and bonding-to-base property) or resin compositions therefor (in terms of sheet moldability). In addition, these flooring materials require improvement of impact resistance.

Patent Document 3 discloses a floor tile formed from a composition containing a thermoplastic polymer component (100 parts by weight) and a filler (900 parts by weight or less), wherein the polymer component contains a specific amount of a block copolymer and/or a hydrogenated product thereof (A), the block copolymer having at least one polymer block formed mainly of a vinyl aromatic compound, and at least one polymer block formed mainly of a conjugated diene compound; a specific amount of a polyolefin resin (B); a specific amount of a polar-group-having ethylene copolymer (C); and optionally, a specific amount of a tackifier (D), a PTFE resin (E), or an acrylic resin (F). This flooring material exhibits, for example, improved moldability, shape-changing property (relaxation of upthrust stress by tile elongation), scratch resistance, and bonding-to-base property, as compared with a resin composition used for conventional non-vinyl chloride floor tiles or flooring materials (see, for example, Patent Document 1 or 2). However, this flooring material is inferior to such a resin composition in terms of dimensional stability and requires improvement of impact resistance and temperature sensitivity (difference between sheet flexibility in summer and that in winter).

Patent Document 1: Japanese Patent Application Laid-Open (kokai) No. H09-32258.
Patent Document 2: Japanese Patent Application Laid-Open (kokai) No. 2000-53822.
Patent Document 3: Japanese Patent Application Laid-Open (kokai) No. 2003-327844.

DISCLOSURE OF THE INVENTION

Problems to be Solved by the Invention

In view of the foregoing, an object of the present invention is to provide a thermoplastic resin composition which exhibits excellent sheet moldability, scratch resistance, impact resistance, dimensional stability, temperature sensitivity, adhesion-to-wax property, bonding-to-base property, and installation performance, and which contains neither a halogen-containing resin (e.g., a vinyl chloride resin) nor a plasticizer (e.g., a phthalic acid ester). Another object of the present invention is to provide a non-vinyl chloride floor tile formed from the thermoplastic resin composition.

Means for Solving the Problems

In order to achieve the aforementioned objects, the present invention provides a thermoplastic resin composition comprising a thermoplastic resin component (I) in an amount of 100 parts by mass and a filler (II) in an amount of 1 to 900 parts by mass, wherein the thermoplastic resin component (I) contains a block copolymer (A) in an amount of 5 to 90 mass %, the block copolymer (A) being at least one species selected from among a block copolymer and a hydrogenated product thereof, the block copolymer having a polymer block (a1) formed mainly of an aromatic vinyl compound unit(s) and a polymer block (a2) formed mainly of a conjugated diene unit(s); a polyolefin resin (B) in an amount of 5 to 90 mass %; and a block copolymer (C) in an amount of 5 to 90 mass %, the block copolymer (C) having a polymer block formed from a repeating unit having a polar group. The present invention also provides a floor tile formed from the thermoplastic resin composition.

Effects of the Invention

According to the present invention, there are provided a thermoplastic resin composition which exhibits excellent sheet moldability, scratch resistance, impact resistance, dimensional stability, temperature sensitivity, adhesion-to-wax property, bonding-to-base property, and installation performance, and which contains neither a halogen-containing resin (e.g., a vinyl chloride resin) nor a plasticizer (e.g., a phthalic acid ester); and a non-vinyl chloride floor tile formed from the thermoplastic resin composition.

BEST MODES FOR CARRYING OUT THE INVENTION

Next will be described in detail the thermoplastic resin composition of the present invention and the floor tile formed from the composition.

The thermoplastic resin composition of the present invention contains a thermoplastic resin component (I) and a filler (II), and the thermoplastic resin component (I) contains a block copolymer (A), a polyolefin resin (B), and a block copolymer (C).

The aforementioned block copolymer (A) is at least one species selected from among a block copolymer and a hydrogenated product thereof, the block copolymer having a polymer block (a1) formed mainly of an aromatic vinyl compound unit(s) [hereinafter may be referred to as an "aromatic vinyl polymer block (a1)"], and a polymer block (a2) formed mainly of a conjugated diene unit(s) [hereinafter may be referred to as a "conjugated diene polymer block (a2)"].

Examples of the aromatic vinyl compound unit(s) forming the aromatic vinyl polymer block (a1) include units derived from, for example, styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, and 2-vinylnaphthalene. Of these, preferred are units derived from styrene, α-methylstyrene, and 4-methylstyrene. The aromatic vinyl polymer block (a1) may be formed from only one of these aromatic vinyl compound units, or two or more of these aromatic vinyl compound units.

The aromatic vinyl polymer block (a1) may include another polymerizable monomer in a small amount (preferably, in an amount of 20 mass % or less on the basis of the entire mass of the aromatic vinyl polymer block (a1)), so long as the polymerizable monomer does not impede the objects and effects of the present invention. Examples of the polymerizable monomer include units derived from, for example, conjugated dienes such as 1,3-butadiene, isoprene, 2,3-dimethyl-1,3-butadiene, 1,3-pentadiene, and 1,3-hexadiene.

Examples of the conjugated diene unit(s) forming the conjugated diene polymer block (a2) include units derived from, for example, 1,3-butadiene, isoprene, 2,3-dimethyl-1,3-butadiene, 1,3-pentadiene, and 1,3-hexadiene. Of these, preferred are units derived from 1,3-butadiene, isoprene, or a mixture of 1,3-butadiene and isoprene. The conjugated diene polymer block (a2) may be formed from only one of these conjugated diene units, or two or more of these conjugated diene units. When the conjugated diene polymer block (a2) is formed from a unit derived from a mixture of two or more conjugated dienes (e.g., 1,3-butadiene and isoprene), no particular limitation is imposed on the mixing ratio or polymerization form (e.g., block polymerization or random polymerization).

The conjugated diene polymer block (a2) may include another polymerizable monomer in a small amount (preferably, in an amount of 10 mass % or less on the basis of the entire mass of the conjugated diene polymer block (a2)), so long as the polymerizable monomer does not impede the objects and effects of the present invention. Examples of the polymerizable monomer include units derived from, for example, aromatic vinyl compounds such as styrene, α-methylstyrene, and 4-methylstyrene.

The aromatic vinyl polymer block (a1) content of the block copolymer (A) is preferably 5 to 55 mass %, more preferably 5 to 50 mass %, much more preferably 10 to 40 mass %. When the aromatic vinyl polymer block (a1) content of the block copolymer (A) exceeds 55 mass %, the resultant thermoplastic resin composition tends to have high hardness, whereas when the aromatic vinyl polymer block (a1) content is less than 5 mass %, the resultant thermoplastic resin composition is likely to conglutinate.

The block copolymer (A) preferably has a glass transition temperature of −45° C. or higher, more preferably −35 to 35° C., much more preferably −20 to 25° C., from the viewpoints of rubber elasticity and toughness of the resultant thermoplastic resin composition.

The block copolymer (A) preferably has a weight average molecular weight of 30,000 to 800,000, more preferably 50,000 to 400,000, much more preferably 70,000 to 200,000, from the viewpoints of dynamic strength and processability of the resultant thermoplastic resin composition. As used herein, "weight average molecular weight" refers to weight average molecular weight in terms of polystyrene as determined through gel permeation chromatography (GPC).

In the block copolymer (A), the aromatic vinyl polymer block (a1) preferably has a weight average molecular weight of 2,500 to 50,000, more preferably 3,000 to 40,000, much more preferably 3,500 to 35,000.

In the block copolymer (A), the mode of bonding between the aromatic vinyl polymer block (a1) and the conjugated diene polymer block (a2) may be linear, branched, radial, or any combination thereof. When the aromatic vinyl polymer block (a1) is represented by A, and the conjugated diene polymer block (a2) is represented by B, the block copolymer (A) may be, for example, a diblock copolymer represented by A-B, a triblock copolymer represented by A-B-A or B-A-B, a tetrablock copolymer represented by A-B-A-B, a pentablock copolymer represented by B-A-B-A-B or A-B-A-B-A, an (A-B)$_n$X copolymer (X represents a coupling agent residue, and n is an integer of 2 or more), and a mixture thereof. The block copolymer (A) is preferably a triblock copolymer represented by A-B-A (among the aforementioned examples), from the viewpoint that the resultant thermoplastic resin composition exhibits excellent scratch resistance, impact resistance, and dimensional stability.

The block copolymer (A) may be produced through, for example, an anionic polymerization method. Examples of the anionic polymerization method include (1) a method in which an aromatic vinyl compound and a conjugated diene are sequentially polymerized by use of an alkyllithium compound serving as an initiator; (2) a method in which an aromatic vinyl compound and a conjugated diene are sequentially polymerized by use of an alkyllithium compound serving as an initiator, followed by coupling through addition of a coupling agent; and (3) a method in which a conjugated diene and an aromatic vinyl compound are sequentially polymerized by use of a dilithium compound serving as an initiator.

Examples of the aforementioned alkyllithium compound include methyllithium, ethyllithium, n-butyllithium, sec-butyllithium, tert-butyllithium, and pentyllithium. Examples of the coupling agent include dichloromethane, dibromomethane, dichloroethane, dibromoethane, and dibromobenzene. Examples of the dilithium compound include naphthalenedilithium and dilithiohexylbenzene.

The amount of an initiator (e.g., an alkyllithium compound or a dilithium compound) or coupling agent employed for polymerization is determined on the basis of the weight average molecular weight of the block copolymer (A) produced. Generally, an initiator (e.g., an alkyllithium compound or a dilithium compound) is employed in an amount of 0.01 to 0.2 parts by mass on the basis of the total amount (100 parts by mass) of an aromatic vinyl compound and a conjugated diene employed for polymerization. When a coupling agent is employed, the amount of the coupling agent is 0.001 to 0.8 parts by mass on the basis of the total amount (100 parts by mass) of the aromatic vinyl compound and the conjugated diene.

Polymerization is preferably carried out in the presence of a solvent. No particular limitation is imposed on the solvent employed, so long as it is inert to the initiator employed and does not adversely affect reaction. Examples of the solvent include saturated aliphatic hydrocarbons and aromatic hydrocarbons, such as hexane, heptane, octane, decane, toluene, benzene, and xylene. When any of the aforementioned polymerization methods is employed, generally, polymerization is carried out at a temperature of 0 to 80° C. for 0.5 to 50 hours.

The block copolymer (A) having a glass transition temperature of −45° C. or higher (preferably −35 to 35° C., more preferably −20 to 25° C.) may be produced by adding, during polymerization, a Lewis base serving as a cocatalyst (e.g., an ether such as dimethyl ether, diethyl ether, or tetrahydrofuran; a glycol ether such as ethylene glycol dimethyl ether or diethylene glycol dimethyl ether; or an amine such as triethylamine, N,N,N',N'-tetramethylethylenediamine, or N-methylmorpholine), thereby controlling the bonding mode of the conjugated diene unit(s) forming the conjugated diene polymer block (a2) of the block copolymer (A). Specifically, the amount of a 1,2-bond unit and a 3,4-bond unit is controlled to 30% or more, preferably 45% or more, more preferably 55% or more.

These Lewis bases may be added singly or in combination of two or more species. The amount of such a Lewis base added is determined on the basis of the extent to which the aforementioned bonding mode of the conjugated diene unit(s) forming the conjugated diene polymer block (a2) is controlled, and no strict limitation is imposed on the amount of the Lewis base. However, generally, the Lewis base is added in an amount of 0.1 to 1,000 mol (preferably 1 to 100 mol) per gram-atom of lithium contained in an alkyllithium compound or a dilithium compound serving as an initiator.

The block copolymer (A) may optionally have, at a side chain or terminal thereof, a functional group. When a block copolymer (A) having a functional group is produced, for example, a block copolymer produced through any of the aforementioned methods is reacted with ethylene oxide or the like (for introduction of a hydroxyl group), or with carbon dioxide (for introduction of a carboxyl group).

If necessary, the above-produced block copolymer may be hydrogenated, to thereby yield a hydrogenated block copolymer (A). Hydrogenation may be carried out by dissolving the above-produced block copolymer in a solvent which is inert to reaction and a hydrogenation catalyst, and reacting the copolymer with hydrogen in the presence of a hydrogenation catalyst such as a Raney nickel catalyst, a heterogeneous catalyst prepared by supporting a metal (e.g., Pt, Pd, Ru, Rh, or Ni) on a carrier (e.g., carbon, alumina, or diatomaceous earth), a Ziegler catalyst made of a combination of a transition metal compound and, for example, an alkylaluminum compound or an alkyllithium compound, or a metallocene catalyst. A polymerization reaction mixture containing the above-produced block copolymer may be employed as is for hydrogenation, without isolation of the block copolymer from the reaction mixture. Generally, hydrogenation may be carried out under the following conditions: hydrogen pressure: 0.1 to 20 MPa, reaction temperature: 20 to 250° C., and reaction time: 0.1 to 100 hours. The hydrogenated block copolymer (A) may be isolated by adding the thus-yielded hydrogenation reaction mixture to a poor solvent for the block copolymer (e.g., methanol), thereby solidifying the copolymer; or by adding the hydrogenation reaction mixture to hot water together with steam for azeotropic removal of solvent (steam stripping), followed by drying.

The amount of the block copolymer (A) contained in the thermoplastic resin component (I) is 5 to 90 mass %, preferably 5 to 80 mass %, more preferably 5 to 70 mass %, on the basis of the total mass (100 mass %) of the resin component (I). When the amount of the block copolymer (A) is less than 5 mass %, a floor tile produced from the thermoplastic resin composition exhibits poor flexibility, whereas when the amount of the block copolymer (A) exceeds 90 mass %, a floor tile produced from the thermoplastic resin composition exhibits poor breaking strength, bonding to a concrete base, adhesion-to-wax property, and installation performance.

The polyolefin resin (B) employed in the thermoplastic resin component (I) may be any of conventionally known polyolefin resins such as polyethylene and polypropylene.

The polyethylene employed may be any of HDPE (high density polyethylene), LDPE (low density polyethylene), LLDPE (linear low density polyethylene), and V-LDPE (very low density polyethylene). Of these, LLDPE or V-LDPE is preferred, from the viewpoint of good compatibility with the block copolymer (A). More preferably, LLDPE or V-LDPE produced through copolymerization of ethylene and an α-olefin by use of a metallocene olefin polymerization catalyst is employed, since the LLDPE or V-LDPE exhibits a narrow molecular weight distribution (Mw/Mn) as determined through GPC and does not contain excessive high-melting-point components which inhibit plastic deformation during calendering. Examples of the aforementioned α-olefin include 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. No particular limitation is imposed on the aforementioned metallocene olefin polymerization catalyst, and it may be a conventionally known metallocene olefin polymerization catalyst.

Examples of the polypropylene include propylene homopolymers, block and random copolymers of propylene and ethylene, and block and random copolymers of propylene and an α-olefin. Examples of the aforementioned α-olefin include 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. The polypropylene may include, as a constitutive unit, ethylene and/or one or more species of the aforementioned α-olefins. Of the aforementioned polymers, for example, a propylene-ethylene copolymer, a propylene-1-butene copolymer, a propylene-ethylene-1-butene copolymer, and a propylene-1-hexene copolymer are preferably employed.

The polyolefin resin (B) may have a functional group such as a hydroxyl group, a carboxyl group, an alkoxyl group, an epoxy group, a glycidyl group, an oxycarbonyl group, a carbonyl group, an amido group, an ester group, and an acid anhydride group.

The polyolefin resin (B) preferably has a melting point of 80 to 150° C., more preferably 80 to 130° C., much more preferably 80 to 120° C., from the viewpoints of sheet moldability and dimensional stability.

The amount of the polyolefin resin (B) contained in the thermoplastic resin component (I) is 5 to 90 mass %, preferably 10 to 70 mass %, more preferably 20 to 50 mass %, on the basis of the total mass (100 mass %) of the resin component (I). Through such a limitation in range of the amount of the polyolefin resin (B), there is yielded a resin composition which exhibits temperature sensitivity similar to that of PVC and which is suitable for use in a non-vinyl chloride floor tile, and a floor tile exhibiting sheet strength within a process temperature range is produced from the resin composition.

The block copolymer (C) employed in the thermoplastic resin component (I) has a polymer block formed from a repeating unit having a polar group. The polymer block is preferably at least one polymer block (c1) selected from among a polyurethane polymer block, a polyester polymer block, a polyamide polymer block, a polycarbonate polymer block, and a (meth)acrylic acid ester polymer block. When the block copolymer (C) has such a polymer block, the polymers contained in the thermoplastic resin component (I) exhibit good compatibility with one another, and a floor tile produced from the composition containing the thermoplastic resin component (I) and the filler (II) exhibits excellent dynamic property, bonding to a concrete base, and adhesion-to-wax property.

The aforementioned polyurethane polymer block is derived from thermoplastic polyurethane produced through reaction between a polymeric diol, an organic diisocyanate, and a chain-extender. The polymeric diol employed for formation of the polymer block preferably has a number average molecular weight of 1,000 to 6,000, from the viewpoint of achievement of, for example, good dynamic property, heat resistance, cold resistance, and elastic recovery. As used herein, "number average molecular weight" of the polymeric diol is calculated on the basis of hydroxyl value as determined through SITE measurement according to JIS K1557.

Examples of the aforementioned polymeric diol include a polyester diol, a polyether diol, a polyester ether diol, a polycarbonate diol, and a polyester polycarbonate diol. The polyurethane polymer block may be formed from one or more species of these polymeric diols.

The aforementioned polyester diol may be, for example, a polyester diol produced through reaction between a low-molecular-weight diol and at least one dicarboxylic acid component selected from among an aliphatic dicarboxylic acid, an aromatic dicarboxylic acid, and an ester-forming derivative thereof; or a polyester diol produced through ring-opening polymerization of a lactone. More specifically, the aforementioned polyester diol may be, for example, a polyester diol, a polycaprolactone diol, or a polyvalerolactone diol produced through polycondensation between one or more species of C6-C12 aliphatic dicarboxylic acids (e.g., glutaric acid, adipic acid, pimelic acid, suberic acid, azelaic acid, sebacic acid, and dodecanedioic acid), aromatic dicarboxylic acids (e.g., terephthalic acid, isophthalic acid, and o-phthalic acid), and ester-forming derivatives thereof, and one or more species of C2-C10 aliphatic diols (e.g., ethylene glycol, propylene glycol, 1,4-butanediol, 1,5-pentanediol, 1,6-hexanediol, 1,9-nonanediol, 3-methyl-1,5-pentanediol, and 2-methyl-1,8-octanediol).

The aforementioned polyether diol may be, for example, polyethylene glycol, polypropylene glycol, or polytetramethylene glycol. The aforementioned polycarbonate diol may be, for example, a polycarbonate diol produced through reaction between one or more species of aliphatic diols (e.g., 1,4-butanediol, 1,5-pentanediol, 1,6-hexanediol, and 1,8-octanediol) and a carbonate ester (e.g., diphenyl carbonate or dialkyl carbonate) or phosgene.

No particular limitation is imposed on the type of the organic diisocyanate employed for producing the polyurethane polymer block, but the organic diisocyanate is preferably one or more species selected from among aromatic diisocyanates, alicyclic diisocyanates, and aliphatic diisocyanates having a molecular weight of 500 or less. Specific examples of such organic diisocyanates include 4,4'-diphenylmethane diisocyanate, toluene diisocyanate, p-phenylene diisocyanate, xylylene diisocyanate, naphthalene diisocyanate, hydrogenated 4,4'-diphenylmethane diisocyanate (4,4'-dicyclohexylmethane diisocyanate), isophorone diisocyanate, and hexamethylene diisocyanate. Of these organic diisocyanates, 4,4'-diphenylmethane diisocyanate is preferably employed.

No particular limitation is imposed on the type of the chain-extender which may be employed for producing the polyurethane polymer block, and the chain-extender may be any of chain-extenders which have conventionally been used for the production of thermoplastic polyurethane elastomers. Among such chain-extenders, one or more species of aliphatic diols, alicyclic diols, and aromatic diols are preferably employed. Specific examples of preferably employed chain-extenders include diols such as ethylene glycol, diethylene glycol, 1,4-butanediol, 1,5-pentanediol, 2-methyl-1,3-propanediol, 1,6-hexanediol, neopentyl glycol, 1,9-nonanediol, cyclohexanediol, and 1,4-bis(β-hydroxyethoxy)benzene. Of the aforementioned diols, a C2-C6 aliphatic diol is more preferably employed as a chain-extender, and 1,4-butanediol is much more preferably employed.

The polyurethane polymer block is preferably a polyurethane polymer block produced by reacting a polymeric diol, a chain-extender, and an organic diisocyanate so that the ratio by mole of the polymeric diol to the chain-extender is 1:0.2-8, and the ratio by mole of [the total amount of the polymeric diol and the chain-extender] to [the amount of the organic diisocyanate] is 1:0.98-1.04.

No particular limitation is imposed on the production method for the polyurethane polymer block, and the polyurethane polymer block may be produced by the prepolymer process or the one-shot process through a known urethane-forming reaction by use of any of the aforementioned polymeric diols, organic diisocyanates, and chain-extenders. Preferably, the polyurethane polymer block is produced through melt polymerization substantially in the absence of a solvent. Particularly preferably, the polyurethane polymer block is produced through continuous melt polymerization by means of a multi-screw extruder.

The polyurethane polymer block may be a commercially available thermoplastic polyurethane elastomer; for example, "Kuramiron U" (trade name) produced by Kuraray Co., Ltd., "Elastollan" (trade name) produced by BASF Polyurethane Elastomers Ltd., "Miractran" (trade name) produced by Nippon Miractran Co., Ltd., "Resamine P" (trade name) produced by Dainichiseika Color & Chemicals Mfg. Co., Ltd., or "U-fine P" (trade name) produced by Asahi Glass Co., Ltd.

The aforementioned polyester polymer block is a polymer block derived from a thermoplastic polyester and is preferably a polyester-polyether thermoplastic polyester block or a polyester-polyester thermoplastic polyester block.

The aforementioned polyester-polyether thermoplastic polyester block may be produced through the following procedure: an oligomer is produced, through esterification or transesterification, from a C2-C12 aliphatic and/or alicyclic diol, an aromatic dicarboxylic acid or an alkyl ester thereof, and a polyalkylene ether glycol having a number average molecular weight of 400 to 6,000; and the thus-produced oligomer is subjected to polycondensation.

The aforementioned C2-C12 aliphatic and/or alicyclic diol may be any of those which have generally been used for the production of thermoplastic polyesters. Examples of the diol include ethylene glycol, propylene glycol, trimethylene glycol, 1,4-butanediol, 1,4-cyclohexanediol, and 1,4-cyclohexanedimethanol. These diols may be employed singly or in combination of two or more species. Of these, the aliphatic and/or alicyclic diol employed is preferably formed mainly of 1,4-butanediol and/or ethylene glycol (in particular, 1,4-butanediol).

The aforementioned aromatic dicarboxylic acid may be any of those which have conventionally been used as raw materials for thermoplastic polyester elastomers. Examples of the aromatic dicarboxylic acid include terephthalic acid, isophthalic acid, phthalic acid, and 2,6-naphthalenedicarboxylic acid. These aromatic dicarboxylic acids may be employed singly or in combination of two or more species. Of these, the aromatic dicarboxylic acid employed is preferably formed mainly of terephthalic acid and/or 2,6-naphthalenedicarboxylic acid (in particular, terephthalic acid). Examples of the aforementioned aromatic dicarboxylic acid alkyl ester include dimethyl esters such as dimethyl terephthalate, dimethyl isophthalate, dimethyl phthalate, and dimethyl 2,6-naphthalate. These alkyl esters may be employed singly or in combination of two or more species. Of these, the aromatic dicarboxylic acid alkyl ester employed is preferably formed mainly of dimethyl terephthalate and/or dimethyl 2,6-naphthalate (in particular, dimethyl terephthalate).

Examples of the aforementioned polyalkylene ether glycol include polyethylene glycol, poly(1,2-propylene ether) glycol, poly(1,3-propylene ether) glycol, polytetramethylene ether glycol, polyhexamethylene ether glycol, block and random copolymers of ethylene oxide and propylene oxide, and block and random copolymers of ethylene oxide and tetrahydrofuran. Of these, polytetramethylene ether glycol is preferably employed for forming the polyester-polyether thermoplastic polyester block.

The polyester-polyether thermoplastic polyester block preferably includes a polyalkylene-ether-glycol-derived structural portion in an amount of 5 to 95 mass %, more preferably 10 to 85 mass %, much more preferably 20 to 80 mass %, on the basis of the entire mass of the polyester block. When the amount of the polyalkylene-ether-glycol-derived structural portion exceeds 95 mass %, difficulty is likely to be encountered in forming the polyester-polyether thermoplastic polyester block through polycondensation.

The polyester-polyether thermoplastic polyester block may be formed through copolymerization of a small amount of a raw material other than the aforementioned raw materials (e.g., a trifunctional polyol, a diol other than the aforementioned ones, a dicarboxylic acid other than the aforementioned ones, or an ester thereof), or may be formed so as to contain a copolymerization component such as an aliphatic dicarboxylic acid (e.g., adipic acid), an alicyclic dicarboxylic acid, or an alkyl ester thereof.

The aforementioned polyester-polyester thermoplastic polyester block has a hard segment and a soft segment. The hard segment is formed of an aromatic polyester produced from an aromatic dicarboxylic acid and an aliphatic and/or alicyclic diol similar to those described above in the polyester-polyether thermoplastic polyester block, and the soft segment is formed of an aliphatic polyester. Examples of the aliphatic polyester forming the soft segment include a polyester oligomer produced through condensation between an aliphatic or alicyclic dicarboxylic acid and an aliphatic diol; and a polyester oligomer synthesized from an aliphatic lactone or an aliphatic monohydroxycarboxylic acid.

The polyester oligomer produced through condensation between an aliphatic or alicyclic dicarboxylic acid and an aliphatic diol—which may form the soft segment of the polyester-polyester thermoplastic polyester block—may be, for example, a polyester oligomer produced through condensation between one or more dicarboxylic acids selected from among alicyclic dicarboxylic acids (e.g., 1,4-cyclohexanedicarboxylic acid, 1,2-cyclohexanedicarboxylic acid, and dicyclohexyl-4,4'-dicarboxylic acid) and aliphatic dicarboxylic acids (e.g., succinic acid, oxalic acid, adipic acid, and sebacic acid), and one or more diols (e.g., ethylene glycol, propylene glycol, tetramethylene glycol, and pentamethylene glycol). The polyester oligomer synthesized from an aliphatic lactone or an aliphatic monohydroxycarboxylic acid—which may form the soft segment of the polyester-polyester thermoplastic polyester block—may be, for example, a polycaprolactone polyester oligomer synthesized from, for example, ε-caprolactone or ω-hydroxycaproic acid.

Esterification, transesterification, or polycondensation for producing the thermoplastic polyester block may be carried out through a customary method. Esterification or transesterification is generally carried out at 120 to 250° C., preferably at 150 to 230° C. Polycondensation is generally carried out under reduced pressure (1,333 Pa or lower (10 torr or lower)) at 200 to 280° C. for two to six hours. Any of these reactions may employ one or more catalysts selected from among, for example, alcoholate compounds, chlorides, and oxides of metals (e.g., tin, titanium, zinc, and manganese). Of these catalysts, an organic titanium compound (in particular, tetrabutyl titanate) is preferably employed.

Production of the thermoplastic polyester block may employ a promoter such as phosphoric acid, phosphorous acid, hypophosphorous acid, or a metal salt thereof. Particularly, reaction in the presence of an alkali metal hypophosphite can produce a thermoplastic polyester block having a low terminal carboxyl group content and exhibiting excellent hydrolysis resistance. Examples of such an alkali metal hypophosphite include sodium hypophosphite, potassium hypophosphite, and lithium hypophosphite. Particularly, sodium hypophosphite is preferably employed. The amount of such an alkali metal hypophosphite added is preferably 1 to 1,000 ppm, more preferably 3 to 200 ppm, much more preferably 5 to 80 ppm, on the basis of the entire amount of the thermoplastic polyester block produced.

In the present invention, the thermoplastic polyester from which the polyester polymer block is derived may be a commercially available thermoplastic polyester elastomer; for example, "Pelprene P" or "Pelprene S" (trade name) produced by Toyobo Co., Ltd., "Hytrel" (trade name) produced by Du Pont-Toray Co., Ltd., "Lomod" (trade name) produced by GE Plastics Japan Ltd., "Nichigo Polyester" (trade name) produced by Nippon Synthetic Chemical Industry Co., Ltd., or "Teijin Polyester Elastomer" (trade name) produced by Teijin Ltd.

The aforementioned polyamide polymer block is a polymer block derived from a thermoplastic polyamide. The polyamide polymer block is preferably a block copolymer having a hard segment formed from a polyamide, and a soft segment formed from a polyether or an aliphatic polyester.

The polyamide forming the aforementioned hard segment is a thermoplastic resin component having an amide bond. Examples of the polyamide include a polyamide produced from an aliphatic, alicyclic, or aromatic diamine (e.g., hexamethylenediamine, decamethylenediamine, dodecamethylenediamine, 2,2,4- or 2,4,4-trimethylhexamethylenediamine, 1,3- or 1,4-bis(aminomethyl)cyclohexane, bis(p-aminocyclohexylmethane), or m- or p-xylylenediamine) and an aliphatic, alicyclic, or aromatic dicarboxylic acid (e.g., adipic acid, suberic acid, sebacic acid, cyclohexanedicarboxylic acid, terephthalic acid, or isophthalic acid); a polyamide produced from an aminocarboxylic acid (e.g., 6-aminocaproic acid, 11-aminoundecanoic acid, or 12-aminododecanoic acid); a polyamide produced from a lactam (e.g., $\epsilon$-caprolactam or $\omega$-dodecalactam); a copolymerized polyamide containing any of these components; and a mixture of these polyamides. Specific examples of the hard segment include nylon 6, nylon 66, nylon 610, nylon 9, nylon 6/66, nylon 66/610, nylon 6/11, nylon 6/12, nylon 11, nylon 12, nylon 46, amorphous nylon, and aromatic nylon. Of these, nylon 6, nylon 11, and nylon 12 are preferred.

Examples of the polyether forming the soft segment include compounds having a repeating unit represented by the formula: —$(CH_2)_n$—O— (wherein n is an integer of 2 to 10). Particularly, polytetramethylene glycol (PTMG) having a repeating unit of —$(CH_2)_4$—O— is preferred. Examples of the aliphatic polyester forming the soft segment include compounds having a repeating unit represented by the formula: —$CO(CH_2)_n$—O— [wherein n has the same meaning as defined above]. Particularly, polycaprolactone having a repeating unit of —$CO(CH_2)_4$—O— is preferred. The ratio by weight of the hard segment to the soft segment is preferably 95/5 to 5/95, more preferably 90/10 to 10/90, from the viewpoints of elastomeric property, oil resistance, and heat resistance.

The polyamide polymer block may be produced by a known method; for example, 1) melt polycondensation through esterification between a polyamide oligomer having a terminal carboxyl group and a polyether or polyester having a terminal hydroxyl group; or 2) melt polycondensation, via a nylon salt, between a polyamide oligomer having a terminal carboxyl group and a polyether or polyester having a terminal amino group, or between a polyamide oligomer having a terminal amino group and a polyether or polyester having a terminal carboxyl group.

In the present invention, the thermoplastic polyamide from which the polyamide polymer block is derived may be a commercially available thermoplastic polyamide; for example, "Pebax" (trade name) produced by Atofina Japan Co., Ltd., "Daiamid-PAE" (trade name) produced by Daicel-Huels Ltd., "UBE Polyamide Elastomer" (trade name) produced by Ube Industries, Ltd., "Novamid PAE" (trade name) produced by Mitsubishi Chemical Corporation, "Grilux A" (trade name) produced by DIC Corporation, or "Grilon ELX, ELY" (trade name) produced by EMS-Chemie (Japan) Ltd.

The aforementioned polycarbonate polymer block is a polymer block derived from a thermoplastic polycarbonate. No particular limitation is imposed on the thermoplastic polycarbonate employed, and it may be any conventionally known thermoplastic polycarbonate. However, preferred is a thermoplastic polycarbonate produced from a divalent phenol compound (e.g., bisphenol A, hydroquinone, 2,2-bis(4-hydroxyphenyl)pentane, 2,4-dihydroxydiphenylmethane, bis(2-hydroxyphenyl)methane, or bis(4-hydroxyphenyl)methane) and a carbonate precursor (e.g., phosgene, a halogen formate, or a carbonate ester). More preferred is a thermoplastic polycarbonate produced from bisphenol A (i.e., a divalent phenol compound) and phosgene (i.e., a carbonate precursor), from the viewpoints of, for example, easy availability and the effect of improving impact resistance. If necessary, the thermoplastic polycarbonate employed may be produced by use of, for example, a molecular weight regulator, a branching agent, or a catalyst. The thermoplastic polycarbonate preferably has a number average molecular weight of 5,000 to 300,000, from the viewpoint of impact resistance.

In the present invention, the thermoplastic polycarbonate from which the polycarbonate polymer block is derived may be a commercially available thermoplastic polycarbonate; for example, "Iupilon" or "Novarex" (trade name) produced by Mitsubishi Engineering-Plastics Corporation, "Panlite" (trade name) produced by Teijin Chemicals Ltd., or "Toughlon" (trade name) produced by Idemitsu Petrochemical Co., Ltd.

The aforementioned (meth)acrylic acid ester polymer block is a polymer block formed from an acrylic acid ester unit and/or a methacrylic acid ester unit. Examples of the acrylic acid ester unit include structural units derived from, for example, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate. Examples of the methacrylic acid ester unit include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, and 2-methoxyethyl methacrylate. These may be employed singly or in combination of two or more species.

The polymer block (c1)—which is selected from among the aforementioned polyurethane polymer block, polyester polymer block, polyamide polymer block, polycarbonate polymer block, and (meth)acrylic acid ester polymer block—preferably has a weight average molecular weight of 10,000 to 400,000, more preferably 20,000 to 300,000, from the viewpoint of achievement of good rubber property of the thermoplastic resin composition of the present invention.

The block copolymer (C) may have two or more polymer blocks (c1), or may have a polymer block (c1) and another polymer block (Y). Examples of the polymer block (Y) include polymer blocks derived from, for example, polyethylene, polypropylene, a copolymer of α-olefin and ethylene and/or propylene, polybutene-1, a styrene homopolymer, an acrylonitrile-styrene copolymer, an acrylonitrile-butadiene-styrene copolymer, an ethylene-propylene copolymer (EPM), an ethylene-propylene-non-conjugated diene copolymer (EPDM), a styrene-butadiene copolymer, a styrene-isoprene copolymer, a hydrogenated product thereof or a modified product thereof, polyisoprene, polybutadiene, polychloroprene, polyisobutylene, an acrylonitrile-butadiene copolymer, polyepichlorohydrin, and polysiloxane. The polymer block (Y) may be a polymer block derived from a block copolymer. The polymer block is preferably a polymer block (c2) formed from at least one block copolymer selected from among a block copolymer and a hydrogenated product thereof, the block copolymer having a polymer block formed mainly of an aromatic vinyl compound unit(s) and a polymer block formed mainly of a conjugated diene unit(s). The polymer block (c2) may be produced in a manner similar to that described above in the block copolymer (A), and the aromatic vinyl compound unit(s), conjugated diene unit(s), molecular weight, bonding mode, etc. of the polymer block (c2) may be similar to those of the block copolymer (A). Specific examples of the polymer block (c2) include styrenic block copolymers such as styrene-isoprene-styrene block copolymer (SIS), styrene-butadiene-styrene block copolymer (SBS), styrene-(isoprene/butadiene)-styrene block copolymer, and hydrogenated products thereof (SEPS, SEBS, and SEEPS).

The mode of bonding between the polymer block (c1) and the polymer block (Y) may be linear, branched, radial, or any combination thereof. When the polymer block (c1) is represented by A, and the polymer block (Y) is represented by B, the block copolymer (C) may be, for example, a diblock copolymer represented by A-B, a triblock copolymer represented by A-B-A or B-A-B, a tetrablock copolymer represented by A-B-A-B, a pentablock copolymer represented by B-A-B-A-B or A-B-A-B-A, an $(A-B)_nX$ copolymer (X represents a coupling agent residue, and n is an integer of 2 or more), and a mixture thereof. The block copolymer (C) is preferably a diblock copolymer represented by A-B (among the aforementioned examples), from the viewpoint of compatibility with the block copolymer (A) and the polyolefin resin (B).

The block copolymer (C) having the polymer block (c1) and the polymer block (Y) may be produced through a known method. For example, the block copolymer (C) may be produced through the following procedure: the polymer block (Y) is produced through anionic polymerization of a monomer forming the polymer block (Y) by use of an organic alkali metal compound serving as a polymerization initiator in the presence of an alkali metal or alkaline earth metal inorganic salt or an organic aluminum compound, and subsequently a polymer forming the polymer block (c1) is added to the polymer block (Y).

The block copolymer (C) having the polymer block (c1) and the polymer block (c2) may be produced through a known method. When, for example, the polymer block (c1) is a polycarbonate polymer block, and the polymer block (c2) is a polymer block derived from a hydrogenated polystyrene-poly(isoprene/butadiene)-polystyrene triblock copolymer (SEEPS), the block copolymer (C) may be produced by preliminarily mixing a polycarbonate polymer with an organometallic compound and a hydrogenated polystyrene-poly(isoprene/butadiene)-polystyrene block copolymer having, at one terminal thereof, a hydroxyl group (SEEPS-OH), and melt-kneading the mixture by means of a twin-screw extruder.

The aforementioned hydrogenated polystyrene-poly(isoprene/butadiene)-polystyrene block copolymer having, at one terminal thereof, a hydroxyl group (SEEPS-OH) may be produced through the following procedure: styrene, a mixture of butadiene and isoprene, and styrene are sequentially subjected to anionic polymerization; ethylene oxide or propylene oxide is added to the resultant block copolymer at the time of attainment of predetermined molecular structure and molecular weight of the block copolymer; and subsequently an active hydrogen compound (e.g., an alcohol, a carboxylic acid, or water) is added to thereby terminate polymerization reaction, followed by hydrogenation (see, for example, specification of Japanese Patent Application Laid-Open (kokai) No. H07-331057).

Examples of the aforementioned organometallic compound include an organic titanium compound, an organic antimony compound, an organic germanium compound, an organic manganese compound, an organic tin compound, an organic zinc compound, an organic calcium compound, an organic lead compound, an organic samarium compound, an organic lanthanum compound, an organic ytterbium compound, an organic cobalt compound, an organic cadmium compound, and an organic magnesium compound. These may be employed singly or in combination of two or more species. Of these, an organic titanium compound, an organic tin compound, and an organic samarium compound are preferred.

The block copolymer (C) may be a diblock copolymer having one polymer block (c1) and one polymer block (c2), or may be a polyblock copolymer formed through bonding of one or more polymer blocks (c1) and one or more polymer blocks (c2) (total number of the blocks: three or more). However, the block copolymer (C) is preferably a diblock copolymer having one polymer block (c1) and one polymer block (c2), from the viewpoints of compatibility, dynamic property, and moldability of the resultant thermoplastic resin composition.

When the block copolymer (C) has the polymer block (c2) and, as the polymer block (c1), a (meth)acrylic acid ester polymer block, preferably, the (meth)acrylic acid ester polymer block is formed mainly of a structural unit derived from a (meth)acrylic acid alkyl (number of carbon atoms: six or more) ester; i.e., a (meth)acrylic acid alkyl ester in which the ester-forming alkyl group has six or more carbon atoms, from the viewpoints that the polymer block (c1) exhibits improved affinity and compatibility with the polymer block (c2), and the thermoplastic resin composition of the present invention exhibits high tear strength, high resistance to polar solvents and chemicals, and excellent transparency. Examples of the (meth)acrylic acid alkyl ester include n-hexyl (meth)acrylate, n-heptyl (meth)acrylate, 2-ethylhexyl (meth)acrylate, and dodecyl (meth)acrylate. The (meth)acrylic acid ester polymer block may have one or more structural units derived from these esters.

When the block copolymer (C) is a block copolymer having two or more polymer blocks (c1), preferably, the block copolymer has two or more (meth)acrylic acid ester polymer blocks. In this case, from the viewpoint of dynamic strength, at least one of the (meth)acrylic acid ester polymer blocks is preferably formed from a structural unit derived from at least one (meth)acrylic acid ester selected from among methyl (meth)acrylate, ethyl (meth)acrylate, tert-butyl (meth)acrylate, cyclohexyl (meth)acrylate, and isobornyl (meth)acrylate, more preferably, a structural unit derived from methyl (meth)acrylate and/or isobornyl (meth)acrylate.

When the block copolymer (C) has a (meth)acrylic acid ester polymer block as the polymer block (c1), the (meth)acrylic acid ester polymer block may have a stereoregular microstructure or a non-stereoregular microstructure. However, the (meth)acrylic acid ester polymer block preferably has a syndiotacticity of 80% or less, particularly preferably 60 to 75%, from the viewpoints of, for example, more excellent transparency, tear strength, etc. of the resultant thermoplastic resin composition, easy production of the block copolymer (C), and production cost.

Specific examples of the block copolymer (C) having a (meth)acrylic acid ester polymer block which is preferably employed in the present invention include [poly(n-butyl acrylate)]-[poly(methyl methacrylate)], [polyethylene]-[poly(n-butyl acrylate)], [polypropylene]-[poly(n-butyl acrylate)], [poly(ethylene/propylene)]-[poly(n-butyl acrylate)], [polybutadiene]-[poly(n-butyl acrylate)], [polyisoprene]-[poly(n-butyl acrylate)], [poly(butadiene/isoprene)]-[poly(n-butyl acrylate)], [hydrogenated polybutadiene]-[poly(n-butyl acrylate)], [hydrogenated polyisoprene]-[poly(n-butyl acrylate)], [hydrogenated poly(butadiene/isoprene)]-[poly(n-butyl acrylate)], [polystyrene]-[poly(n-butyl acrylate)], [poly(styrene/butadiene)]-[poly(n-butyl acrylate)], [poly(styrene/isoprene)]-[poly(n-butyl acrylate)], [hydrogenated poly(styrene/butadiene)]-[poly(n-butyl acrylate)], [hydrogenated poly(styrene/isoprene)]-[poly(n-butyl acrylate)], SIS-[poly(n-butyl acrylate)], SBS-[poly(n-butyl acrylate)], SIBS-[poly(n-butyl acrylate)], SEPS-[poly(methyl methacrylate)], SEBS-[poly(n-butyl acrylate)], SEEPS-[poly(n-butyl acrylate)], [poly(2-ethylhexyl acrylate)]-[poly(methyl methacrylate)], [polyethylene]-[poly(2-ethylhexyl acrylate)], [polypropylene]-[poly(2-ethylhexyl acrylate)], [poly(ethylene/propylene)]-[poly(2-ethylhexyl acrylate)], [polybutadiene]-[poly(2-ethylhexyl acrylate)], [polyisoprene]-[poly(2-ethylhexyl acrylate)], [poly(butadiene/isoprene)]-[poly(2-ethylhexyl acrylate)], [hydrogenated polybutadiene]-[poly(2-ethylhexyl acrylate)], [hydrogenated polyisoprene]-[poly(2-ethylhexyl acrylate)], [hydrogenated poly(butadiene/isoprene)]-[poly(2-ethylhexyl acrylate)], [polystyrene]-[poly(2-ethylhexyl acrylate)], [poly(styrene/butadiene)]-[poly(2-ethylhexyl acrylate)], [poly(styrene/isoprene)]-[poly(2-ethylhexyl acrylate)], [hydrogenated poly(styrene/butadiene)]-[poly(2-ethylhexyl acrylate)], [hydrogenated poly(styrene/isoprene)]-[poly(2-ethylhexyl acrylate)], SIS-[poly(2-ethylhexyl acrylate)], SBS-[poly(2-ethylhexyl acrylate)], SIBS-[poly(2-ethylhexyl acrylate)], SEPS-[poly(2-ethylhexyl acrylate)], SEBS-[poly(2-ethylhexyl acrylate)], SEEPS-[poly(2-ethylhexyl acrylate)], [polyethylene]-[poly(methyl methacrylate)], [polypropylene]-[poly(methyl methacrylate)], [poly(ethylene/propylene)]-[poly(methyl methacrylate)], [polybutadiene]-[poly(methyl methacrylate)], [polyisoprene]-[poly(methyl methacrylate)], [poly(butadiene/isoprene)]-[poly(methyl methacrylate)], [hydrogenated polybutadiene]-[poly(methyl methacrylate)], [hydrogenated polyisoprene]-[poly(methyl methacrylate)], [hydrogenated poly(butadiene/isoprene)]-[poly(methyl methacrylate)], [polystyrene]-[poly(methyl methacrylate)], [poly(styrene/butadiene)]-[poly(methyl methacrylate)], [poly(styrene/isoprene)]-[poly(methyl methacrylate)], [hydrogenated poly(styrene/butadiene)]-[poly(methyl methacrylate)], [hydrogenated poly(styrene/isoprene)]-[poly(methyl methacrylate)], SIS-[poly(methyl methacrylate)], SBS-[poly(methyl methacrylate)], SIBS-[poly(methyl methacrylate)], SEPS-[poly(methyl methacrylate)], SEBS-[poly(methyl methacrylate)], SEEPS-[poly(methyl methacrylate)], [poly(methyl acrylate)]-[poly(n-butyl acrylate)]-[poly(methyl methacrylate)], [poly(methyl acrylate)]-[poly(2-ethylhexyl acrylate)]-[poly(methyl methacrylate)], [poly(methyl methacrylate)]-[poly(ethyl acrylate)]-[poly(methyl methacrylate)], [poly(methyl methacrylate)]-[poly(n-butyl acrylate)]-[poly(methyl methacrylate)], [poly(methyl methacrylate)]-[poly(2-ethylhexyl acrylate)]-[poly(methyl methacrylate)], [hydrogenated polybutadiene]-[poly(ethyl acrylate)]-[hydrogenated polybutadiene], [hydrogenated polybutadiene]-[poly(n-butyl acrylate)]-[hydrogenated polybutadiene], [hydrogenated polybutadiene]-[poly(2-ethylhexyl acrylate)]-[hydrogenated polybutadiene], [polystyrene]-[poly(ethyl acrylate)]-[polystyrene], [polystyrene]-[poly(n-butyl acrylate)]-[polystyrene], and [polystyrene]-[poly(2-ethylhexyl acrylate)]-[polystyrene]. Of these, [poly(methyl methacrylate)]-[poly(n-butyl acrylate)]-[poly(methyl methacrylate)] and [poly(methyl methacrylate)]-[poly(2-ethylhexyl acrylate)]-[poly(methyl methacrylate)] are more preferably employed, from the viewpoint of heat resistance.

No particular limitation is imposed on the method for producing the block copolymer (C) having a (meth)acrylic acid ester polymer block employed in the present invention, and the block copolymer (C) may be produced through a known production method. For example, the block copolymer (C) is generally produced through a method in which monomers forming the respective polymer blocks are subjected to living polymerization. Examples of such a living polymerization method include 1) a method in which anionic polymerization is carried out by use of an organic alkali metal compound serving as a polymerization initiator in the presence of an alkali metal or alkaline earth metal inorganic salt; 2) a method in which anionic polymerization is carried out by use of an organic alkali metal compound serving as a polymerization initiator in the presence of an organic aluminum compound; 3) a method in which polymerization is carried out by use of an organic rare earth metal complex serving as a polymerization initiator; and 4) a method in which radical polymerization is carried out by use of an α-halogenated ester compound serving as an initiator in the presence of a copper compound.

Of the aforementioned production methods, the method 2) is preferably employed, since the block copolymer (C) having a (meth)acrylic acid ester polymer block is produced at high purity, the molecular weight of the copolymer and the compositional proportions of the components thereof are readily controlled, and production cost is reduced. When the block copolymer (C) is produced through the method 2), preferably, polymerization is carried out in an organic solvent (e.g., toluene or cyclohexane) in the presence of a polyamine (in particular, N,N,N',N'',N''-pentamethyldiethylenetriamine) so that the (meth)acrylic acid ester polymer block has a syndiotacticity of 80% or less (preferably 60 to 75%).

The amount of the block copolymer (C) contained in the thermoplastic resin component (I) is 5 to 90 mass %, preferably 5 to 80 mass %, more preferably 5 to 70 mass %, on the basis of the total mass (100 mass %) of the resin component (I). When the amount of the block copolymer (C) is less than 5 mass %, a floor tile produced from the thermoplastic resin composition exhibits poor breaking strength, whereas when the amount of the block copolymer (C) exceeds 90 mass %, a floor tile produced from the resin composition exhibits poor installation performance.

The thermoplastic resin component (I) of the present invention may optionally contain a tackifying resin (D) in addition to the aforementioned block copolymer (A), polyolefin resin (B), and block copolymer (C). The tackifying resin (D) may be any of tackifying resins employed in the fields of adhesive tape, paint, and hot-melt adhesive, but is preferably a tackifying resin containing a solid amorphous polymer.

The tackifying resin (D) employed in the present invention generally has a weight average molecular weight (Mw) as determined through GPC of 1,000 to 3,000, preferably 1,200 to 2,500. Examples of the tackifying resin (D) include an aliphatic hydrocarbon resin produced mainly from, for example, isoprene or 1,3-pentadiene contained in a fraction obtained through cracking of petroleum, naphtha, or the like (e.g., a C4 fraction, a C5 fraction, a mixture thereof, or any of these fractions); an aromatic hydrocarbon resin produced mainly from a styrene derivative or an indene compound contained in a C9 fraction obtained through cracking of petroleum, naphtha, or the like; an aliphatic-aromatic copolymerized hydrocarbon resin produced through copolymerization of a C9 fraction and any of a C4 fraction and a C5 fraction; an alicyclic hydrocarbon resin produced through hydrogenation of an aromatic hydrocarbon resin; a synthetic terpene hydrocarbon resin having aliphatic, alicyclic, and aromatic hydrocarbon resin structures; a terpene hydrocarbon resin produced from αβ-pinene contained in turpentine oil; a coumarone-indene hydrocarbon resin produced from indene or a styrene compound contained in coal tar naphtha; a low-molecular-weight styrene resin; and a rosin hydrocarbon resin.

Of the aforementioned tackifying resins (D), an aliphatic hydrocarbon resin or an alicyclic hydrocarbon resin produced through hydrogenation of an aromatic hydrocarbon resin is preferably employed, from the viewpoint of good dispersibility in the block copolymer (A). Particularly preferred is an alicyclic hydrocarbon resin having a softening point (as measured by the ring and ball method) of 105 to 150° C. (preferably 110 to 140° C.), in which the percent hydrogenation of the aromatic nucleus is 80% or more (preferably 85% or more).

The aforementioned tackifying resins (D) may be employed singly or in combination of two or more species. The amount of the tackifying resin (D) contained in the thermoplastic resin component (I) is 1 to 20 mass %, preferably 3 to 17 mass %, on the basis of the total mass of the resin component (I). Through such a limitation in range of the amount of the tackifying resin (D), there is yielded a thermoplastic resin composition exhibiting improved sheet moldability (calender moldability) and being capable of producing a non-vinyl chloride floor tile.

The thermoplastic resin component (I) of the present invention may optionally contain a paraffin-base oil. No particular limitation is imposed on the type of the paraffin-base oil which may be employed in the present invention, and any oil called "paraffin oil" may be employed. In general, an oil used as a process oil or the like is a mixture containing, for example, a component having an aromatic ring (e.g., benzene ring or naphthene ring) and a paraffin component (a chain hydrocarbon), and "paraffin oil" refers to an oil in which carbon atoms forming the paraffin chain account for 50 mass % or more of all the carbon atoms of the oil. A paraffin-base oil containing an aromatic-ring-having component in an amount of 5 mass % or less is preferably employed.

The thermoplastic resin composition of the present invention preferably employs a paraffin-base oil having a kinetic viscosity at 40° C. of 20 to 800 mm$^2$/s, a flow temperature of 0 to −40° C., and a flash point of 200 to 400° C., more preferably a paraffin-base oil having a kinetic viscosity at 40° C. of 50 to 600 mm$^2$/s, a flow temperature of 0 to −30° C., and a flash point of 250 to 350° C. As used herein, "kinetic viscosity (mm$^2$/s) at 40° C." of a paraffin-base oil (E) is determined by dividing the viscosity of the oil as measured by means of a B-type viscometer at 40° C. by the density of the oil as measured at 40° C.

The aforementioned paraffin-base oils may be employed singly or in combination of two or more species. If necessary, the paraffin-base oil(s) are employed in an amount of 10 mass % or less, preferably 5 mass % or less, on the basis of the total mass of the thermoplastic resin component (I). Through such a limitation in range of the amount of the paraffin-base oil(s), there is yielded a thermoplastic resin composition exhibiting improved flexibility and sheet moldability (calender moldability) and being capable of producing a non-vinyl chloride floor tile.

The thermoplastic resin component (I) may optionally contain an additional thermoplastic resin such as polystyrene or ABS. The amount of such an additional thermoplastic resin contained in the thermoplastic resin component (I) is preferably 5 mass % or less on the basis of the total mass of the resin component (I).

The thermoplastic resin composition of the present invention contains the aforementioned thermoplastic resin component (I) in an amount of 100 parts by mass, and the filler (II) in an amount of 1 to 900 parts by mass. The filler (II) may be a commercially available filler. Examples of the filler include inorganic fillers such as calcium carbonate, talc, clay, synthetic silicon, titanium oxide, carbon black, barium sulfate, magnesium hydroxide, aluminum hydroxide, and zinc flower. These fillers may be employed singly or in combination of two or more species. The filler (II) may be surface-treated with, for example, a fatty acid or an ester thereof, a silane coupling agent, a petroleum resin, a resin acid, coumarilic acid, ABS resin, or a paraffin. The filler (II) is preferably calcium carbonate, from the viewpoint of production cost. The amount of the filler is preferably 200 to 900 parts by mass, more preferably 500 to 900 parts by mass, on the basis of 100 parts by mass of the thermoplastic resin component (I).

The thermoplastic resin composition of the present invention may optionally contain an additive such as a reinforcing agent (e.g., carbon fiber or glass fiber), a lubricant, silicone oil, a light stabilizer, a UV absorbent, an antioxidant, a pigment, a flame retardant, an antistatic agent, an antiblocking agent, a mold release agent, a cross-linking agent, a cross-linking aid, a foaming agent, or a perfume. No particular limitation is imposed on the amount of such an additive contained in the resin composition, so long as the additive does not impede the effects of the present invention. However, generally, the amount of such an additive is preferably 50 parts by mass or less on the basis of the total amount (100 parts by mass) of the thermoplastic resin component (I).

The thermoplastic resin composition of the present invention may be produced, through a conventionally known method, by melt-mixing the block copolymer (A), the polyolefin resin (B), the block copolymer (C), and the filler (II), and optionally the tackifying resin (D), a paraffin oil, an additional thermoplastic resin, or an additive. No particular limitation is imposed on the melt-mixing method employed, so long as the aforementioned components can be uniformly mixed by the method. Generally, the thermoplastic resin composition is produced through a method in which the aforementioned components are simultaneously or sequentially added to, for example, a Henschel mixer, a V-type blender, a tumbler mixer, or a ribbon blender, followed by mixing, and subsequently the mixture is melt-kneaded by means of, for example, a single-screw extruder, a multi-screw extruder, a kneader, a roller, or a Banbury mixer. Generally, the thermoplastic resin composition of the present invention can be produced through melt-kneading at about 170 to about 250° C. for about 30 seconds to about 15 minutes.

Since the thermoplastic resin composition of the present invention has low melt viscosity and exhibits high melt fluidity and excellent moldability, the resin composition can be molded by itself into a variety of products. The thus-molded products exhibit excellent flexibility, elasticity, dynamic property, and oil resistance. Molding may be carried out through any of molding techniques generally used for thermoplastic resins, such as injection molding, extrusion, press molding, blow molding, calendaring, and cast molding. From the viewpoint of productivity, calendering is preferably employed.

The floor tile of the present invention can be produced by means of common PVC processing equipment. The floor tile can be produced by molding the aforementioned thermoplastic resin composition (in the form of pellets or powder) into a sheet or a tile by means of a conventional apparatus used for the production of floor sheets or floor tiles (e.g., a calendering machine, an extruder, a heat pressing machine, or a laminator). In the present invention, floor tiles of different designs can be produced through application of production methods for vinyl chloride resin floor tiles of, for example, single-color type, multi-color chip type, and film laminate type. The floor tile of the present invention may have a single-layer structure, or a multi-layer structure including two or more layers. In the floor tile of the present invention, a printed layer may be provided below a transparent surface layer.

EXAMPLES

The present invention will next be described in detail with reference to Referential Examples, Examples, and Comparative Examples. However, the present invention is not limited to the Examples described hereinbelow. Measurements described in the Referential Examples and Examples were determined as follows.

(1) Measurement of Glass Transition Temperature:

Each of block copolymers (A) produced in Referential Examples 1 to 3 described hereinbelow was press-molded by means of a press molding machine, to thereby prepare a sheet having a thickness of 2 mm [molding temperature: 200° C., preheating time: 1 minute, press pressure: 10 MPa, press time: 1 minute, and cooling time: 1 minute (at 30° C.)]. A sample (about 10 mg) was prepared from the resultant sheet and applied to a differential scanning calorimeter (DSC 200, product of Seiko Instruments Inc.) in a nitrogen atmosphere under the following measuring conditions (temperature range: −100 to 100° C., temperature elevation rate: 10 degrees (° C.)/minute). The temperature corresponding to the inflection point in a measurement curve was employed as a glass transition temperature.

(2) Production of Thermoplastic Resin Composition and Molded Sheet:

All the component materials of each of the Examples or Comparative Examples described hereinbelow were added together to a Banbury mixer (product of Kobe Steel, Ltd.), followed by melt-kneading at a rotor temperature of 200° C. and a rotor rotation speed of 76.6 rpm for five minutes. Thereafter, the thus-produced thermoplastic resin composition was molded into a sheet having a thickness of 2 mm by means of a calender roller (product of Kansai Roll Co., Ltd.) (roller temperature: 170° C.)

(3) Evaluation of Calender Moldability:

Calender moldability of the thermoplastic resin composition produced above in (2) was evaluated according to the following ratings:

AA: a sheet having a smooth surface is produced less than one minute after addition of the resin composition to a calender roller;

BB: a sheet having a smooth surface is produced one to three minutes after addition of the resin composition to a calender roller;

CC: cracks remain in a portion of a sheet even three minutes after addition of the resin composition to a calender roller; and DD: the resin composition does not wind around a roller or considerably conglutinates to the roller (i.e., not moldable) even three minutes after addition of the resin composition to a calender roller.

(4) Measurement of Hardness:

The hardness of the molded sheet produced above in (2) was measured according to ISO 7619 (type D). In this test, the thus-measured hardness preferably falls within a range of 65 to 75.

(5) Measurement of Tensile Breaking Strength and Tensile Elongation at Break:

Dumbbell test pieces (No. 5) were punched out of the molded sheet produced above in (2). Each test piece was subjected to measurement in terms of tensile breaking strength and tensile elongation at break according to ISO 37.

(6) Evaluation of Dimensional Stability:

Test pieces (30.3 cm×30.3 cm×0.2 cm) were punched out of the molded sheet produced above in (2). Each test piece was left in a gear oven at 70° C. for 100 hours. The length of one side of the test piece was measured before and after heating in the oven, and the rate of change in length was determined. Dimensional stability was evaluated according to the following ratings:

○: the rate of change in length is less than 0.7%;

Δ: the rate of change in length is 0.7% or more and less than 1.2%; and x: the rate of change in length is 1.2% or more.

(7) Evaluation of Impact Resistance (Resistance of Sheet to Cracking Due to Impact):

Test pieces (30.3 cm×30.3 cm×0.2 cm) were punched out of the molded sheet produced above in (2). Each test piece was caused to fall from a height of 1 m onto a concrete surface so that the side surfaces of the test piece were perpendicular thereto. The degree of breakage was evaluated according to the following ratings:

○: the test piece is not broken at all;

Δ: the test piece is slightly deformed (dented); and x: the test piece is broken.

(8) Measurement of Deflection Angle

Test pieces (30.3 cm×30.3 cm×0.2 cm) were punched out of the molded sheet produced above in (2). An edge portion of each test piece having a width of 5 cm as measured from the edge of one side of the test piece) was horizontally fixed on a table and left in an atmosphere of 25° C. or 40° C. for 30 seconds. Thereafter, the angle between the horizontal plane and the unfixed portion of the test piece (i.e., deflection angle) was measured. The greater the deflection angle, the poorer the installation performance of the sheet. Also, the greater the difference in the deflection angle between the two temperatures, the greater the seasonal variation regarding installation performance of the sheet.

(9) Evaluation of Bonding to Concrete Base:

Test pieces (30.3 cm×30.3 cm×0.2 cm) were punched out of the molded sheet produced above in (2). An epoxy adhesive was uniformly applied onto a concrete base by means of a brush, and each test piece was placed on the concrete base. Subsequently, the test piece was pressed by means of a roller, and then the adhesive was cured through drying. Adhesion of the test piece to the concrete base was evaluated according to the following ratings:

◯: the test piece completely adheres to the concrete base;

Δ: a small space is provided between the test piece and the concrete base; and x: the test piece weakly adheres to the concrete base, and an edge of the test piece curls upward.

(10) Evaluation of Adhesion of Wax to Sheet:

Test pieces (30.3 cm×30.3 cm×0.2 cm) were punched out of the molded sheet produced above in (2). An existing maintenance wax was applied onto each test piece and dried. Thereafter, there was carried out a cross-cut adhesion test (i.e., 100 square sections, each having a size of 2 mm×2 mm, were formed by cross-cutting the dried wax, and the number of square sections exfoliated by an adhesive tape was counted). Adhesion of the wax to the test piece was evaluated according to the following ratings:

◯: the number of exfoliated square sections is zero;

Δ: the number of exfoliated square sections is less than 15; and x: the number of exfoliated square sections is 15 or more.

Referential Example 1

Production of Block Copolymer (A)-1

(1) The atmosphere of a dried pressure-resistant container was purged with nitrogen. Cyclohexane (60 L) serving as a solvent and sec-butyllithium (0.21 L) serving as a polymerization initiator were added to the container, followed by heating to 50° C. Thereafter, styrene (2.4 L) was added to the container, and polymerization was carried out for two hours. Subsequently, a monomer mixture of isoprene and butadiene (50:50 by mass) (16.6 L) was added to the container, and polymerization was carried out for three hours. Thereafter, styrene (2.4 L) was added to the container, and polymerization was carried out for two hours. The resultant polymerization reaction mixture was added to methanol (80 L) for reprecipitation. The precipitated solid was separated through filtration and dried at 50° C. for 20 hours, to thereby yield a polystyrene-poly(isoprene/butadiene)-polystyrene triblock copolymer.

(2) Subsequently, the triblock copolymer yielded above in (1) (11 kg) was dissolved in cyclohexane (100 L), and Pd—C (supported Pd content: 5 mass %) serving as a hydrogenation catalyst was added to the resultant solution so that the ratio of the catalyst to the triblock copolymer was 5 mass %, followed by hydrogenation (hydrogen pressure: 2 MPa, temperature: 150° C.) for 10 hours. After cooling and pressure release, the Pd—C catalyst was removed through filtration, and the filtrate was concentrated, followed by vacuum drying, to thereby yield a hydrogenated polystyrene-poly(isoprene/butadiene)-polystyrene triblock copolymer [hereinafter may be referred to as "block copolymer (A)-1"].

(3) The block copolymer (A)-1 yielded above in (2) was found to have a glass transition temperature of −56° C. as determined through the aforementioned method. Also, the block copolymer (A)-1 was found to have a styrene content of 30 mass %, a percent hydrogenation of 97%, and a weight average molecular weight of 80,000.

Referential Example 2

Production of Block Copolymer (A)-2

(1) There were employed cyclohexane (60 L) serving as a solvent, sec-butyllithium (0.14 L) serving as a polymerization initiator, and N,N,N',N'-tetramethylethylenediamine (0.12 L) serving as a Lewis base. In a manner similar to that described in Referential Example 1 (1), the following monomers: styrene (2.7 L), isoprene (17.2 L), and styrene (2.7 L) were sequentially added for polymerization, to thereby yield a non-hydrogenated polystyrene-polyisoprene-polystyrene triblock copolymer [hereinafter may be referred to as "block copolymer (A)-2"].

(2) The block copolymer (A)-2 yielded above in (1) was found to have a glass transition temperature of 8° C. as determined through the aforementioned method. Also, the block copolymer (A)-2 was found to have a styrene content of 30 mass % and a weight average molecular weight of 130,000 (percent hydrogenation: 0%).

Referential Example 3

Production of Block Copolymer (A)-3

(1) There were employed cyclohexane (60 L) serving as a solvent, sec-butyllithium (0.09 L) serving as a polymerization initiator, and tetrahydrofuran (0.37 L) serving as a Lewis base. In a manner similar to that described in Referential Example 1 (1), the following monomers: styrene (0.5 L), a monomer mixture of isoprene and butadiene (50:50 by mass) (20.0 L), and styrene (1.5 L) were sequentially added for polymerization, to thereby yield a polystyrene-poly(isoprene/butadiene)-polystyrene triblock copolymer.

(2) The triblock copolymer yielded above in (1) was subjected to hydrogenation in a manner similar to that described in Referential Example 1 (2), to thereby yield a hydrogenated polystyrene-poly(isoprene/butadiene)-polystyrene triblock copolymer [hereinafter may be referred to as "block copolymer (A)-3"].

(3) The block copolymer (A)-3 yielded above in (2) was found to have a glass transition temperature of −30° C. as determined through the aforementioned method. Also, the block copolymer (A)-3 was found to have a styrene content of 12 mass %, a percent hydrogenation of 90%, and a weight average molecular weight of 150,000.

Referential Example 4

Polyolefin Resin (B)

"Evolue SP1540" (trade name, product of Mitsui Chemicals, Inc., LLDPE; MFR=3.8 g/10 min)

Referential Example 5

Production of Block Copolymer (C)-1 Having a Polymer Block Formed from a Repeating Unit Having a Polar Group A hydrogenated polystyrene-poly(isoprene/butadiene)-polystyrene triblock copolymer having a hydroxyl group at one terminal of the molecule (SEEPS-OH) [weight average molecular weight=115,000, styrene content=28 mass %, percent hydrogenation of poly(isoprene/butadiene) block=98%, glass transition temperature=−15° C., average number of hydroxyl groups=0.9/molecule] (100 parts by mass) and thermoplastic polyurethane ("Kuramiron 1180", product of Kuraray Co., Ltd.) (100 parts by mass) were dry-blended, and the mixture was melt-kneaded by means of a twin-screw extruder ("TEX-44XCT", product of The Japan Steel Works, Ltd.) at a cylinder temperature of 220° C. and a screw rotation speed of 150 rpm. Thereafter, the thus-kneaded product was extruded into a strand form and then cut into pellets. Unreacted polyurethane was removed from the thus-obtained pellets through extraction with dimethylformamide, and subsequently unreacted SEEPS-OH was removed through extraction with cyclohexane, followed by drying of the residual solid, to thereby yield a polyurethane block copolymer in which the polymer block (SEEPS) is bonded to the thermoplastic polyurethane ("Kuramiron 1180") [hereinafter the block copolymer may be referred to as "block copolymer (C)-1"].

Referential Example 6

Production of Block Copolymer (C)-2 Having a Polymer Block Formed from a Repeating Unit Having a Polar Group A hydrogenated polystyrene-poly(isoprene/butadiene)-polystyrene triblock copolymer having a hydroxyl group at one terminal of the molecule (SEEPS-OH) [weight average molecular weight=115,000, styrene content=28 mass %, percent hydrogenation of poly(isoprene/butadiene) block=98%, glass transition temperature=−15° C., average number of hydroxyl groups=0.9/molecule] (100 parts by mass), polycarbonate resin ("Panlite L1225", product of Teijin Chemicals Ltd.) (100 parts by mass), and $Bu_2SnO$ (dibutyltin oxide) (0.0025 parts by weight) were preliminarily mixed together, and the mixture was melt-kneaded by means of a twin-screw extruder (TEX44C, product of The Japan Steel Works, Ltd.) at a cylinder temperature of 275° C. and a screw rotation speed of 150 rpm. The thus-kneaded product was extruded into a strand form, followed by cutting, to thereby yield pellets of a polycarbonate block copolymer [hereinafter may be referred to as "block copolymer (C)-2"].

Referential Example 7

Production of (Meth)Acrylic Acid Ester Copolymer (C)-3 Having a (Meth)Acrylic Acid Ester Polymer Block and Another (Meth)Acrylic Acid Ester Polymer Block (1) The atmosphere of a dried pressure-resistant container was purged with nitrogen. Toluene (800 mL) serving as a solvent, N,N,N',N'',N''-pentamethyldiethylenetriamine (2.5 mL) serving as a Lewis base, a toluene solution (34 mL) of 0.6 mol/L isobutylbis(2,6-di-t-butyl-4-methylphenoxy)aluminum serving as a Lewis acid, and 1.3 mol/L sec-butyllithium (3.5 mL) serving as a polymerization initiator were added to the container. Subsequently, a methyl methacrylate monomer (32 mL) was added to the container, and reaction was carried out at room temperature for three hours. Thereafter, the internal temperature of the polymerization mixture was lowered to −15° C., and an n-butyl acrylate monomer (150 mL) was added dropwise to the container over seven hours. Subsequently, a methyl methacrylate monomer (32 mL) was added to the container, and the reaction mixture was heated to room temperature, followed by stirring for about 10 hours. The reaction mixture was added to a large amount of methanol, and the thus-precipitated product was recovered, to thereby yield a (meth)acrylic acid ester block copolymer [hereinafter may be referred to as "(meth)acrylic acid ester block copolymer (C)-3"].

(2) The (meth)acrylic acid ester block copolymer (C)-3 yielded above in (1) was found to have a syndiotacticity of poly(methyl methacrylate) block of 68%, a weight average molecular weight of 77,000, and a methyl methacrylate unit content of 30 wt. %.

Other components employed in the below-described Examples and Comparative Examples are as follows.
Ethylene-vinyl acetate copolymer: (trade name) Evaflex 210 [product of Pu Pont-Mitsui Polychemicals Co., Ltd., vinyl acetate content=28%]
Maleic anhydride-modified VLDPE: (trade name) Admer XE070 [product of Mitsui Chemicals, Inc.]
Polycarbonate resin: (trade name) Panlite L-1225 [product of Teijin Chemicals Ltd.]
Poly(methyl methacrylate) resin: (trade name) Parapet G [product of Kuraray Co., Ltd.]
Tackifying resin (D): (trade name) Clearon P125 [product of Yasuhara Chemical Co., Ltd., hydrogenated terpene resin]
Filler (II):
  Heavy calcium carbonate: (trade name) Whiton SB Red [product of Shiraishi Calcium Kaisha, Ltd.]
  Talc: (trade name) Talc FFR [product of Asada Milling Co., Ltd., hydrous magnesium silicate]
Antioxidant: (trade name) Irganox 1010 [product of Ciba Specialty Chemicals Inc., hindered phenolic antioxidant]

Examples 1 to 7 and Comparative Examples 1 to 7

As shown in Table 1 below, components of a thermoplastic resin composition containing, as a component of the thermoplastic resin component (I), the block copolymer (C)-1 (Examples 1 and 2), the block copolymer (C)-2 (Examples 3 and 4), or the block copolymer (C)-3 (Examples 5 to 7), or components of a thermoplastic resin composition containing no block copolymer (C) (Comparative Examples 1 to 7) were added together to a Banbury mixer (product of Kobe Steel, Ltd.), followed by melt-kneading at a rotor temperature of 200° C. and a rotor rotation speed of 76.6 rpm. Thereafter, the thus-produced thermoplastic resin composition was molded into a sheet having a thickness of 2 mm by means of a calender roller (product of Kansai Roll Co., Ltd.) (roller temperature: 170° C.), whereby calender moldability of the thermoplastic resin composition was evaluated. Test pieces were prepared from the thus-molded sheet and tested for tensile strength, elongation at break, and dimensional stability. The molded sheet was also evaluated in terms of impact resistance upon working, deflection angle (at 25° C. or 40° C.), bonding to concrete base, and adhesion-to-wax property. The formulations of compositions and the test results are shown in Table 1.

TABLE 1

|  | Ex. 1 | Ex. 2 | Ex. 3 | Ex. 4 | Ex. 5 | Ex. 6 | Ex. 7 |
|---|---|---|---|---|---|---|---|
| Thermoplastic resin component (I) (parts by mass) |  |  |  |  |  |  |  |
| Block copolymer (A)-1 | 30 |  | 40 |  |  | 32 |  |
| Block copolymer (A)-2 |  | 24 |  | 30 |  |  | 26 |
| Block copolymer (A)-3 |  |  |  |  | 20 |  |  |
| Polyolefin resin (B) | 40 | 37 | 35 | 42 | 30 | 32 | 40 |

TABLE 1-continued

| | | | | | | | |
|---|---|---|---|---|---|---|---|
| Block copolymer (C)-1 | 30 | 31 | | | | | |
| Block copolymer (C)-2 | | | 25 | 13 | | | |
| Block copolymer (C)-3 | | | | | 50 | 19 | 34 |
| Ethylene-vinyl acetate copolymer | | | | | | | |
| Maleic anhydride-modified VLDPE | | | | | | | |
| Polycarbonate resin | | | | | | | |
| Poly(methyl methacrylate) resin | | | | | | | |
| Tackifying resin (D) | | 8 | | 15 | | 17 | |
| Filler (II) (parts by mass) | | | | | | | |
| Heavy calcium carbonate | 400 | 450 | 200 | 200 | 300 | 400 | 450 |
| Talc | | | 100 | 150 | | | |
| Antioxidant (parts by mass) | 0.1 | | 0.1 | 0.1 | 0.1 | 0.1 | |
| Calender moldability | BB | AA | BB | AA | AA | BB | BB |
| Properties of sheet | | | | | | | |
| Hardness (type D) | 67 | 67 | 65 | 69 | 67 | 65 | 66 |
| Breaking strength (MPa) | 9.5 | 8.6 | 9.0 | 8.2 | 8.8 | 9.1 | 12 |
| Elongation at break (%) | 30 | 20 | 30 | 30 | 20 | 30 | 20 |
| Dimensional stability | ○ | ○ | ○ | ○ | ○ | ○ | ○ |
| Installation performance | | | | | | | |
| Impact resistance (cracking due to impact) | ○ | ○ | ○ | ○ | ○ | ○ | ○ |
| Deflection angle at 25° C. (°) | 22 | 25 | 8 | 10 | 12 | 19 | 14 |
| Deflection angle at 40° C. (°) | 28 | 30 | 15 | 16 | 18 | 25 | 19 |
| Bonding to concrete base | ○ | ○ | ○ | ○ | ○ | ○ | ○ |
| Adhesion-to-wax property | ○ | ○ | ○ | ○ | ○ | ○ | ○ |

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Thermoplastic resin component (I) (parts by mass) | | | | | | | |
| Block copolymer (A)-1 | 50 | 22 | | 30 | | | |
| Block copolymer (A)-2 | | | | | 52 | | 26 |
| Block copolymer (A)-3 | | | 87 | | | 18 | |
| Polyolefin resin (B) | 50 | 26 | | 40 | 26 | 33 | 40 |
| Block copolymer (C)-1 | | | | | | | |
| Block copolymer (C)-2 | | | | | | | |
| Block copolymer (C)-3 | | | | | | | |
| Ethylene-vinyl acetate copolymer | | 39 | | | | | 34 |
| Maleic anhydride-modified VLDPE | | | | | 9 | | |
| Polycarbonate resin | | | | 30 | | | |
| Poly(methyl methacrylate) resin | | | | | | 33 | |
| Tackifying resin (D) | | 13 | 13 | | 13 | 16 | |
| Filler (II) (parts by mass) | | | | | | | |
| Heavy calcium carbonate | 450 | 160 | 200 | 400 | 400 | 300 | 450 |
| Talc | | | 50 | | | 100 | |
| Antioxidant (parts by mass) | | 0.1 | 0.1 | 0.1 | 0.1 | | |
| Calender moldability | CC | BB | DD | DD | BB | CC | CC |
| Properties of sheet | | | | | | | |
| Hardness (type D) | 75 | 58 | — | — | 65 | 80 | 62 |
| Breaking strength (MPa) | 6.8 | 6.0 | — | — | 6.4 | 8.5 | 8.6 |
| Elongation at break (%) | 10 | 30 | — | — | 20 | 20 | 20 |
| Dimensional stability | ○ | x | — | — | Δ | ○ | ○ |
| Installation performance | | | | | | | |
| Impact resistance (cracking due to impact) | Δ | ○ | — | — | ○ | Δ | ○ |
| Deflection angle at 25° C. (°) | 15 | 26 | — | — | 14 | 10 | 29 |
| Deflection angle at 40° C. (°) | 22 | 43 | — | — | 20 | 17 | 42 |
| Bonding to concrete base | Δ | ○ | — | — | ○ | ○ | ○ |
| Adhesion-to-wax property | x | ○ | — | — | Δ | Δ | ○ |

As is clear from data shown in Table 1, the thermoplastic resin compositions satisfying the requirements of the present invention; specifically, the compositions of Examples 1 and 2, each containing the block copolymer (C)-1, the compositions of Examples 3 and 4, each containing the block copolymer (C)-2, and the compositions of Examples 5 to 7, each containing the block copolymer (C)-3, are well-balanced in terms of calender moldability, dynamic property, dimensional stability, installation performance, impact resistance, deflection angle (at 25° C. or 45° C.), bonding to concrete base, and adhesion-to-wax property, as compared with the thermoplastic resin compositions of Comparative Examples 1 to 7, each containing no block copolymer (C).

INDUSTRIAL APPLICABILITY

The thermoplastic resin composition of the present invention exhibits excellent sheet moldability, scratch resistance, impact resistance, dimensional stability, temperature sensitivity, adhesion-to-wax property, bonding-to-base property, and installation performance, and contains neither a halogen-containing resin (e.g., a vinyl chloride resin) nor a plasticizer (e.g., a phthalic acid ester). Therefore, the thermoplastic resin composition is suitable for use in a non-vinyl chloride floor tile.

The invention claimed is:

1. A thermoplastic resin composition comprising:
a thermoplastic resin component (I) in an amount of 100 parts by mass; and
a filler (II) in an amount of 200 to 900 parts by mass,
wherein the thermoplastic resin component (I) comprises:
a block copolymer (A) in an amount of 5 to 90 mass %, the block copolymer (A) being at least one species selected from the group consisting of a block copolymer and a hydrogenated product thereof, the block copolymer having a polymer block (a1) comprising an aromatic vinyl compound unit(s) and a polymer block (a2) comprising a conjugated diene unit(s);
a polyolefin resin (B) in an amount of 5 to 90 mass %; and
a block copolymer (C) in an amount of 5 to 90 mass %, the block copolymer (C) having a polymer block formed from a repeating unit having a polar group, wherein
the block copolymer (C) is a first block copolymer (C-1) or a second block copolymer (C-2), wherein
the first block copolymer (C-1) is a block copolymer comprising a polymer block (c1) and a polymer block (c2), the polymer block (c1) being selected from the group consisting of a polyurethane polymer block, a polyester polymer block, a polyamide polymer block, a polycarbonate polymer block, and a (meth)acrylic acid ester polymer block, and the polymer block (c2) comprising at least one block copolymer selected from the group consisting of a block copolymer having a polymer block comprising an aromatic vinyl compound unit(s) and a polymer block comprising a conjugated diene unit(s) and a hydrogenated product thereof, and
the second block copolymer (C-2) is a (meth)acrylic acid ester block copolymer having a first (meth)acrylic acid ester polymer block, and a second (meth)acrylic acid ester polymer block which is different from the first (meth)acrylic acid ester polymer block.

2. A thermoplastic resin composition as described in claim 1, wherein the block copolymer (A) has a glass transition temperature of −45° C. or higher and a polymer block (a1) content of 5 to 55 mass %.

3. A thermoplastic resin composition as described in claim 1, wherein the thermoplastic resin component (I) further comprises a tackifying resin (D) in an amount of 1 to 20 mass %.

4. A floor tile formed from a thermoplastic resin composition as recited in claim 1.

5. A thermoplastic resin composition as described in claim 2, wherein the thermoplastic resin component (I) further comprises a tackifying resin (D) in an amount of 1 to 20 mass %.

6. A floor tile formed from a thermoplastic resin composition as recited in claim 2.

7. A floor tile formed from a thermoplastic resin composition as recited in claim 3.

8. A thermoplastic resin composition as described in claim 1, wherein the thermoplastic resin component (I) comprises the polyolefin resin (B) in an amount of 10 to 70 mass % of 100 mass % of the thermoplastic resin component (I).

9. A thermoplastic resin composition as described in claim 8, wherein the thermoplastic resin component (I) comprises the polyolefin resin (B) in an amount of 20 to 50 mass % of 100 mass % of the thermoplastic resin component (I).

10. A floor tile formed from a thermoplastic resin composition as recited in claim 5.

11. A thermoplastic resin composition as described in claim 1, wherein the thermoplastic resin component (I) comprises the block copolymer (C) in an amount of 5 to 70 mass % of 100 mass % of the thermoplastic resin component (I).

12. A thermoplastic resin composition as described in claim 2, wherein the thermoplastic resin component (I) comprises the block copolymer (C) in an amount of 5 to 70 mass % of 100 mass % of the thermoplastic resin component (I).

13. A thermoplastic resin composition as described in claim 3, wherein the thermoplastic resin component (I) comprises the tackifying resin (D) in an amount of 3 to 17 mass % of 100 mass % of the thermoplastic resin component (I).

14. A thermoplastic resin composition as described in claim 5, wherein the thermoplastic resin component (I) comprises the tackifying resin (D) in an amount of 3 to 17 mass % of 100 mass % of the thermoplastic resin component (I).

* * * * *